United States Patent [19]

Ono

[11] Patent Number: 5,508,839
[45] Date of Patent: Apr. 16, 1996

[54] CONTROL OF A LAUNCHED POLARIZATION STATE OF A FREQUENCY MODULATED BEAM COINCIDENT WITH AN OPTICAL FIBER PRINCIPAL AXIS

[75] Inventor: Takashi Ono, Tokyo, Japan

[73] Assignee: NEC Corporation, Tokyo, Japan

[21] Appl. No.: 220,025

[22] Filed: Mar. 30, 1994

[30] Foreign Application Priority Data

Mar. 30, 1993 [JP] Japan .................................. 5-071399

[51] Int. Cl.[6] ................................................. G02F 01/23
[52] U.S. Cl. .......................... 359/278; 359/122; 359/156; 359/192
[58] Field of Search ..................... 359/109, 192, 359/110, 124, 156, 278, 122

[56] References Cited

U.S. PATENT DOCUMENTS

| | | | |
|---|---|---|---|
| 4,637,072 | 1/1987 | Hellström | 455/607 |
| 5,013,116 | 5/1991 | Yamazaki et al. | 350/96.15 |
| 5,031,998 | 7/1991 | Ono et al. | 350/96.29 |
| 5,295,013 | 3/1994 | Ono | 359/192 |

OTHER PUBLICATIONS

T. Ono et al., "Novel Wideband Common Polarization Control Method for Coherent FDM Transmission System", Proceedings of ECOC '90, pp. 419–422.

H. Shimizu et al., "Highly Practical Fiber Squeezer Polarization Controller", Journal of Lightwave Technology, vol. 9, No. 10, Oct. 1991, pp. 1217–1224.

Poole et al., "Polarization Dispersion and Principal States in a 147–km Undersea Lightwave Cable", Journal of Lightwave Technology, vol. 6, No. 7, Jul. 1988, pp. 1185–1190.

*Primary Examiner*—Mark Hellner
*Attorney, Agent, or Firm*—Sughrue, Mion, Zinn, Macpeak & Seas

[57] ABSTRACT

In an optical communication system for transmitting an optical fiber which may include an optical amplifier comprising an optical isolator, a polarization control system comprises at a send end a launch polarization controller for giving a launched state to the signal beam launched to the optical fiber. Received at a receive end as a received beam of a received state of polarization, the signal beam is split by polarization into first and second beams, each including a reception component of the modulating frequency and of a variable optical intensity. A detection signal is produced from the first and the second beams to have the modulating frequency and a variable electric intensity. Controlled by a launch controller supplied with the detection signal, the launch polarization controller keeps the launched state to minimize at the receive end the electric intensity. Preferably, the received beam is split into four beams, which are given four differents direction of polarization, and from which the detection signal is produced.

5 Claims, 3 Drawing Sheets

CONTROL OF A LAUNCHED POLARIZATION STATE OF A FREQUENCY MODULATED BEAM COINCIDENT WITH AN OPTICAL FIBER PRINCIPAL AXIS

BACKGROUND OF THE INVENTION

This invention relates to control of a launched polarization state of a signal beam in coincidence with a principal axis of polarization of an optical fiber. More particularly this invention relates to a method of controlling the launched state, a polarization control system, a polarization control device for controlling the launched state.

As a prior-art polarization control system, a polarization control system for bidirectionally transmitted signal beams is disclosed in U.S. Pat. No. 5,031,998 issued to Takashi Ono, the present inventor, and another hereinafter "th Ono patent". The specification of this United States patent is herein incorporated by reference. In such a polarization control system, polarization controllers are used. It is possible to use as polarization controllers the controller described in an article contributed to the Journal of Lightwave Technology, Volume 9, No. 10 (October 1991), pages 1217 to 1224, entitled "Highly Practical Fiber Squeezer Polarization Controller" by Haruhito Shimizu et. al. The instant inventor is a coauthoer of this work. The, polarization control system of the United States patent is also described in a paper contributed by T. Ono, the present inventor, and three others to the Proceedings of ECOC '90, pages 419 to 422, under the title of "Novel Wideband Common Polarization Control Method for Coherent FDM Transmission System".

Before the prior-art polarization control system was revealed, long-distance transmission of a signal beam through an optical fiber gave rise to accumulation of polarization dispersion in the optical fiber which resulted in an objectionable power penalty. Polarization dispersion results from a difference in a propagation time between two orthogonal principal states, or eigen modes, of an optical fiber. This difference distorts the shape of a received beam and degrades. Reception sensitivity depending upon a launched polarization state with which the signal beam is launched or supplied to the optical fiber. The principal states are described in an article contributed by C. D. Poole et. al. to the Journal of Lightwave Technology, Volume 6, No. 7 (July 1988), pages 1180 to 1190, entitled "Polarization Dispersion and Principal States in a 147 km Undersea Lightwave Cable".

In prior-art polarization control systems, the signal beam and a pilot beam are bidirectionally transmitted through an optical fiber. It both ends of the optical fiber, polarization controllers are connected, and controlled. In this polarization control system, the signal beam is subjected to frequency division multiplexing (FDM) with its launched polarization state kept by the polarization controller to maintain coincidence with a principal axis of polarization defined by the principal states of the fiber. This suppresses adverse effects which would otherwise be imparted to the received beam.

Although subjected to the frequency division multiplexing the signal beam was not frequency modulated in the prior-art polarization control system. Furthermore, the bidirectional transmission is not applicable to an optical fiber which includes an optical amplifier comprising an optical isolator.

SUMMARY OF THE INVENTION

Consequently it is an object of the present invention to provide a method of controlling a polarization state of an optical beam subjected to frequency modulation.

It is another object of this invention to provide a polarization control method which is of the type described and which is applicable to an optical communication system comprising an optical fiber which may include an optical isolator.

It is still another object of this invention to provide a polarization control method which is of the type described and which can suppress waveform distortion caused by polarization dispersion.

It is yet another object of this invention to provide a polarization control method which is of the type described and which allows a high sensitivity to reception of the optical beam.

It is a further object of this invention to provide a polarization control system and a polarization control device which is applicable to the polarization control method of the type described.

Other objects of this invention will become clear as the description proceeds.

According to an aspect of this invention, there is provided a method for controlling a polarization state of an optical beam subjected to frequency modulation by a modulating frequency for transmission as a signal beam through an optical fiber having a principal axis of polarization and which comprises the steps of: (A) launch controlling the polarization state into a launched state to supply a launched beam of the launched state to the optical fiber as the signal beam; (B) receiving the signal beam as a received beam which an intensity variable reception component of the modulating frequency to produce a detection signal representative of an intensity of the reception component, and (C) axis controlling, with the detection signal, the launch controlling step to keep the launched state in coincidence with the principal axis.

According to a different aspect of this invention, there is provided a polarization control system for use in an optical communication system for transmitting as a signal beam, an optical beam modulated by a modulating frequency, through an optical fiber having a principal axis of polarization and which comprises: (A) a launch polarization controller for controlling the polarization state into a launched state to supply a launched beam of the launched state to the optical fiber as the signal beam; (B) receiving means for receiving the signal beam as a received beam having a received state of polarization and including an intensity variable reception component of the modulating frequency to produce a detection signal representative of an intensity of the reception component; and (C) axis controlling means for controlling, which the detection signal, the launch polarization controller to keep the launched state in coincidence with the principal axis.

According to another aspect of this invention, there is provided a polarization control device which is used in an optical communication system comprising a launch polarization controller controlling a polarization state of an optical beam modulated by a modulating frequency into a launched state to supply as a signal beam a launched beam of the launched state to an optical fiber having a principal axis of polarization and a control means for controlling the launch polarization controller, where the device comprises: (A) receiving means for receiving the signal beam as a received beam including an intensity variable reception component of the modulating frequency to produce a detection signal representative of an intensity of the reception components and (B) signal supply means for supplying the detection signal to the control means to make the control means transmit the detection signal to the launch polarization controller as a reception signal and control the launch polarization controller by the reception signal to keep the launched state in coincidence with the principal axis.

Figure 3A:
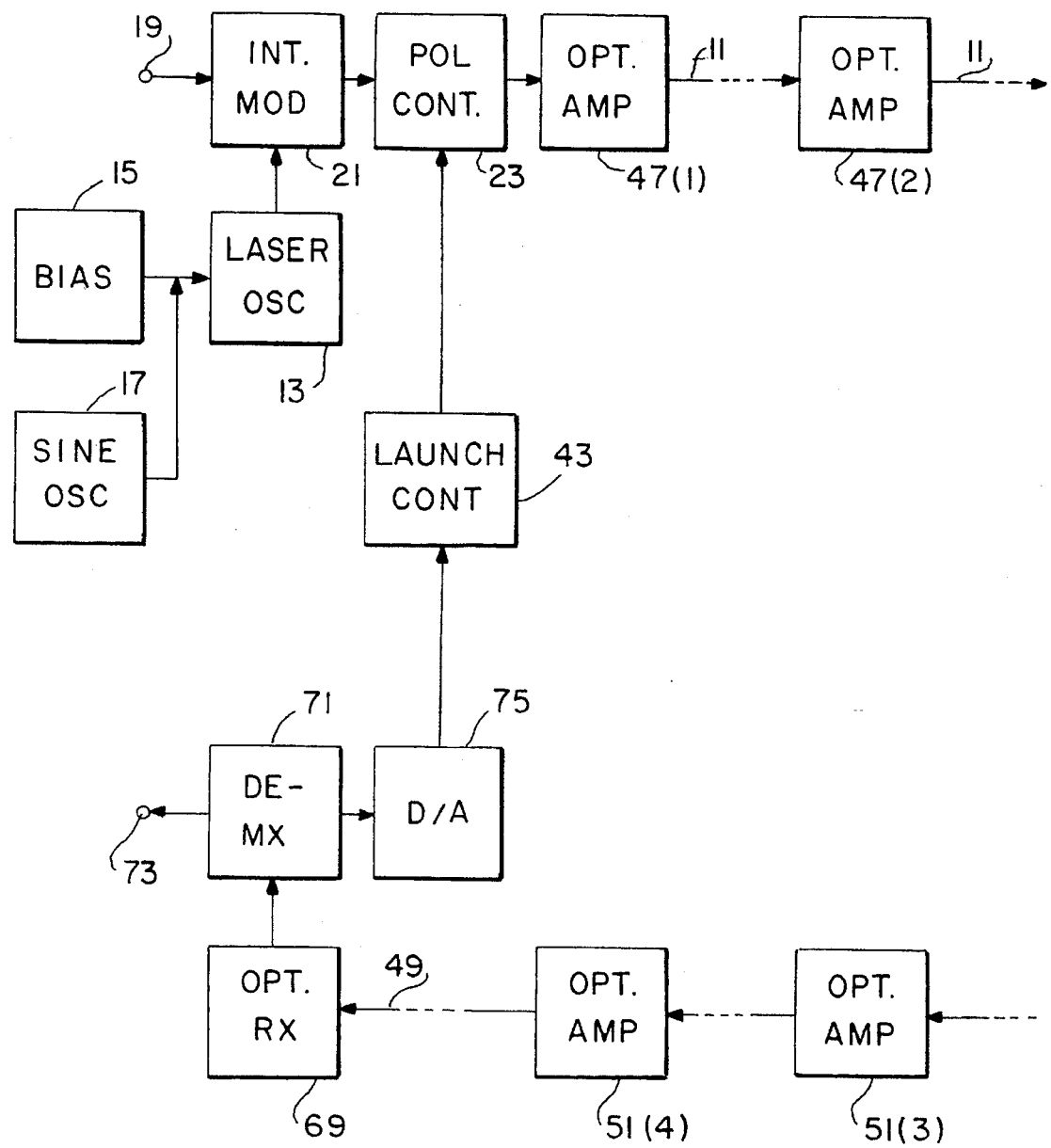
Figure 3B:
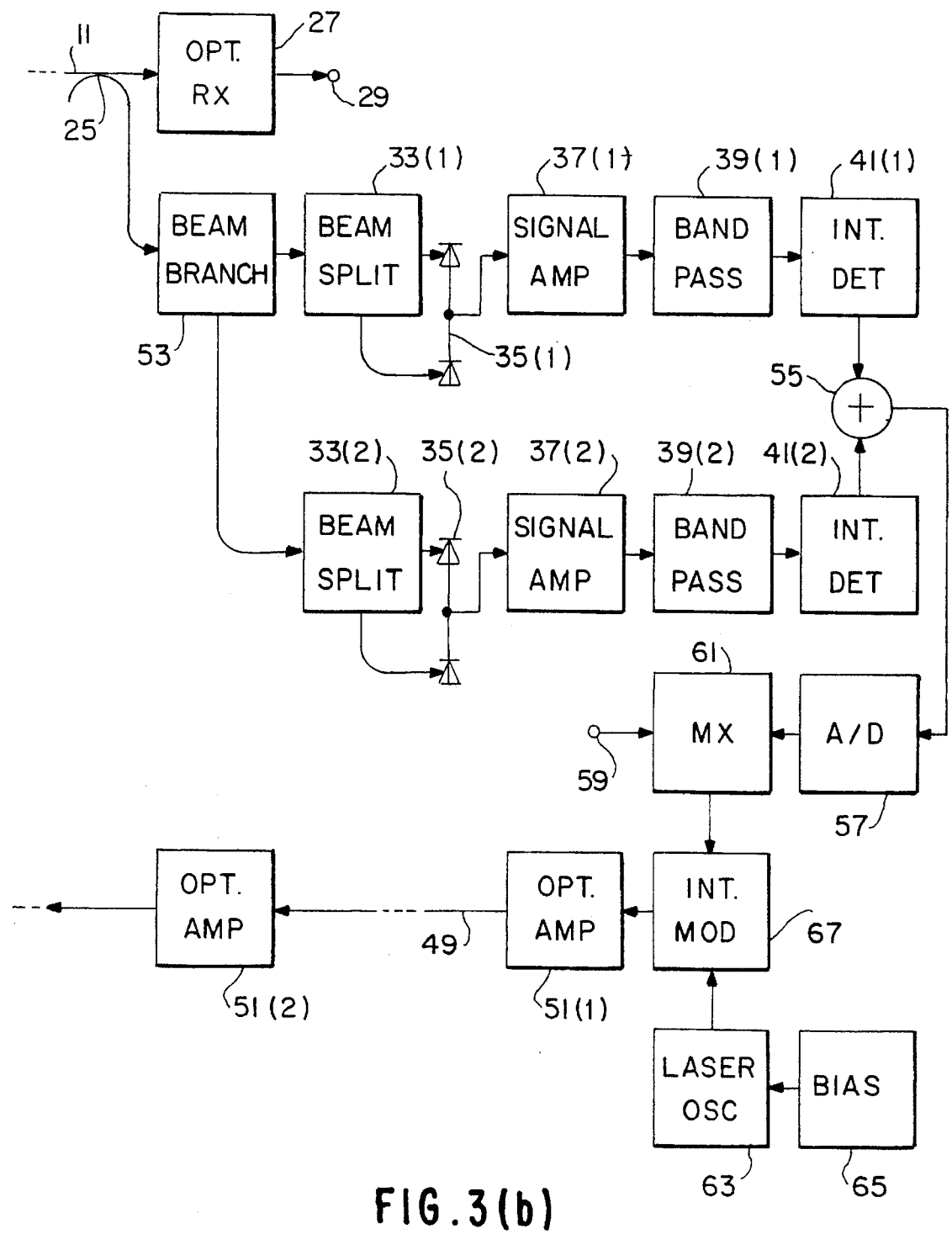

Fig, 2 is a schematic diagram illustrating of an optical fiber and operation of the polarization control system depicted in Fig, 1 and FIGS. 3(a) and 3(b) together illustrate a block diagram of a polarization control system according to a second embodiment of this invention in an optical communication system.

DESCRIPTION OF THE PREFERRED EMBODIMENTS

Figure 1:
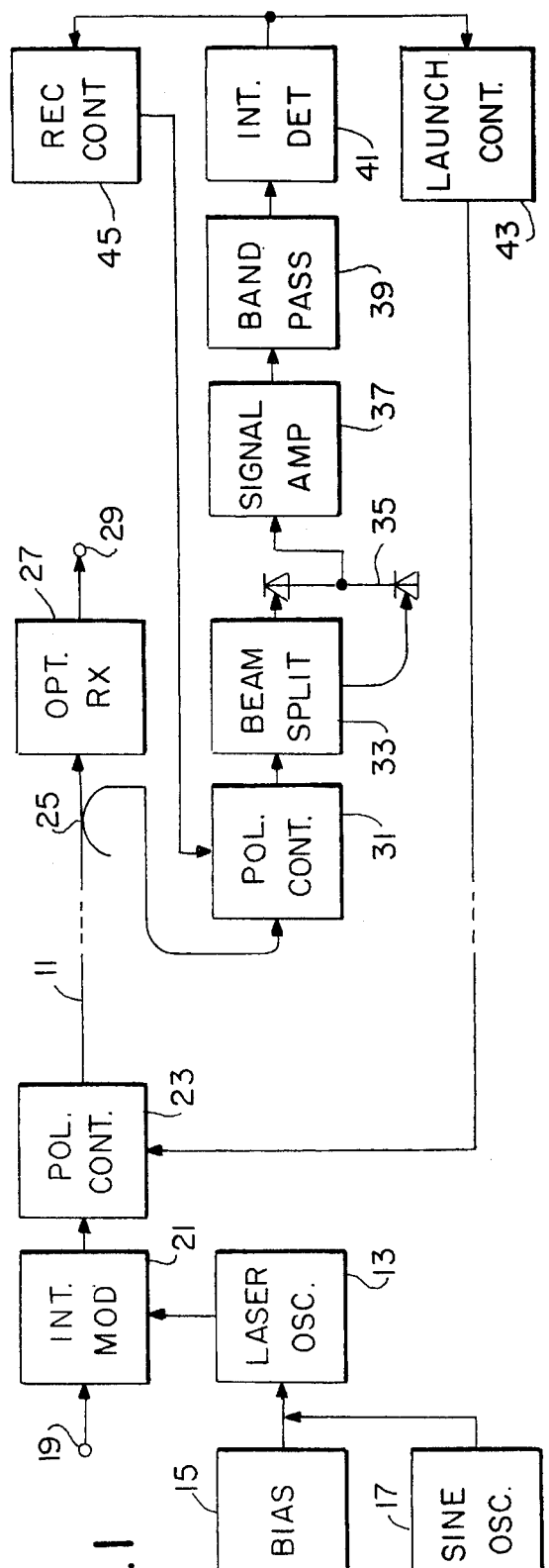
FIG. 1 is a block diagram of a polarization control system according to a first embodiment of the instant invention in an optical communication system.

Referring to FIG. 1, the description will begin with a polarization control system according to a first embodiment of the present invention. The polarization control system is for use in an optical communication system.

In the example illustrated, the optical communication system is operable as a 10-Gb/s optical intensity modulation (IM) and direct-detection (DD) reception system, wherein a main signal beam is transmitted from a send end to a receive end through a main optical fiber 11, which is of a 1.55-micrometer zero-dispersion type and is 100 km long. It will be presumed that the optical fiber 11 has a polarization dispersion of 50 ps.

A main laser oscillator 13 comprises a semiconductor laser diode (not shown). A main bias current source 15 delivers a bias current of 100 mA to the laser diode to make the laser oscillator 13 produce a 1.5-micrometer main optical beam. A sinusoidal oscillator 17 superposes a sinusoidal signal of 100 kHz on the bias current to subject the optical beam to frequency modulation (FM). The sinusoidal signal is produced to have an amplitude for giving the optical beam a frequency shift of 10 GHz. In this manner, the optical beam is frequency modulated into the signal beam by a modulating frequency of 100 kHz.

At the send end, a system input terminal 19 is supplied with a transmission data signal of 10 Gb/s. Controlled by the data signal, a main intensity modulator 21 subjects the signal beam to intensity modulation to make the signal beam transmit the data signal as a transmitted data signal to the receive end through the optical fiber 11. Before being launched or supplied to the optical fiber 11, the signal beam is passed through a launch polarization controller 23, which is a part of the polarization control system.

Preferably in the manner described in the Shimizu et. al. article mentioned above, the polarization controller 23 is of a fiber squeezer type and is reliably and continuously operable to change a polarization state or plane of an input signal beam to a desired state of polarization. In any event, the polarization controller 23 gives a launched state of polarization to a launched beam for supply to the optical fiber 11 as the signal beam.

At the receive end, the signal beam is branched by an optical coupler 25 into two beam parts, both frequency modulated and carrying the transmitted data signal. One of the beam parts is delivered to a main optical receiver 27 for detecting the transmitted data signal to deliver a reproduction of the transmission data signal to a system output terminal 29.

The other beam part is delivered as a received beam to a reception polarization controller 31, which is preferably of the fiber squeezer type. During transmission through the optical fiber 11, the signal beam is subjected to the polarization dispersion. The beam reaches the polarization controller 31 with a received state of polarization and is processed in a manner which will presently be described. The polarization controller 31 controls the received state to a controlled state of polarization and produces a controlled beam with the controlled state.

The controlled beam is delivered to a polarization splitter 35 and split into first and second split beams which are orthogonally polarized. Each of the first and the second split beams includes an optical reception component resulting has a variable optical intensity $I_o$ which depends on the received from the sinusoidal signal to have the modulating frequency and state of the received beam.

In the illustrated example, the first and the second sit beams are delivered to two light receiving parts of a balanced optical receiver comprising dual pin photodiodes 35 and a signal amplifier 37. The balanced optical receiver (35, 37) produces an electric output signal including a demodulated signal as a detected component which results from the sinusoidal signal and has the modulating frequency and a variable electric intensity corresponding to the variable optical intensity.

The output signal is delivered to a band-pass filter 39 which has a passband of a center frequency of 100 kHz and produces the detected component. Supplied with the detected component, an electric intensity detector 41 produces an electric detection signal representative of the variable electric intensity, namely, the variable optical intensity of the reception component.

It may be mentioned here that an optical fiber has two orthogonal principal states, or eigen modes, for a polarized optical beam travelling therethrough and consequently a principal axis of polarization in the manner described in the Ono patent. Supplied with the detection signal from the receive end through a signal transmission line, a launch controller 43 controls at the send end the launch polarization controller 23 to control the launched state into coincidence with the principal axis of the optical fiber 11. At the receive end, the detection signal is additionally delivered to a reception controller 45 to control the reception polarization controller 31 to keep the variable electric intensity at a maximum intensity.

Figure 2:
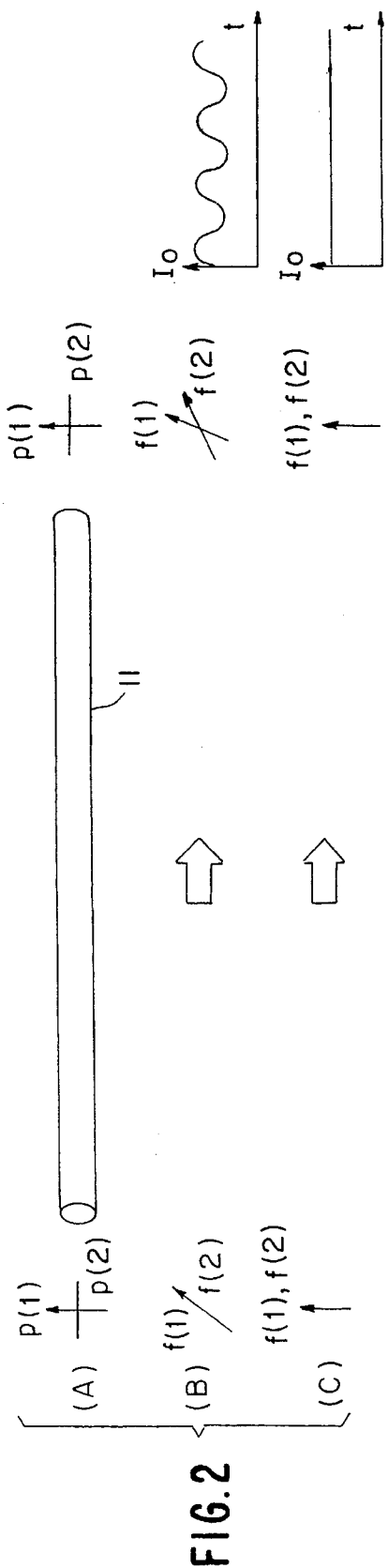

Turning to FIG. 2 in conjunction with FIG. 1, the optical fiber 11 is illustrated along a top or first row labelled (A). The send and the receive ends of the optical communication system are on the left and the right sides of the optical fiber 11 in the top row. The principal states are depicted by p(1) and p(2) on the left and the right sides of the optical fiber 11.

In the manner described in above, the launched beam is frequency modulated to include a launched component having an optical frequency variable between first and second optical frequencies f(1) and f(2). The launched state of polarization does not vary throughout the launched component, namely, between the first and the second optical frequencies.

It will first be assumed in the manner exemplified along a middle or second row labelled (B) that the launched beam is supplied to the optical fiber 11 with the launched state incoincident with the principal axis of polarization of the optical fiber 11. In this event, the received state varies as a result of the polarization dispersion between first and second states as exemplified at the receive end, depending on the optical frequency of the optical reception component. When the received beam is caused to pass through the polarization splitter 33, the optical reception component in each of the first and the second split beams is given the optical intensity $I_o$ which varies with time t in accordance with the sinusoidal signal of the sinusoidal oscillator 17. As a consequence, it is possible for the balanced optical detector to produce the alemodulated component.

It will now be assumed in the manner illustrated along a bottom or third row labelled (C) that the launched beam is supplied to the optical fiber 11 with the launched state in coincidence with the principal axis of polarization in the optical fiber 11. In this event, the received state is in coincidence with the principal axis and is identical throughout the optical reception component. When the received beam passes through the polarization splitter 33, the optical reception component has a constant intensity that depends on angle of incidence of the received beam on the polarization splitter 33. The variable optical intensity $I_o$ is not variable with the time t. The batanoed optical receiver produces the demodulated signal with a zero intensity.

It is therefore understood that the launched state is coincident with the principal axis of polarization when the variable electric intensity, and accordingly the electric detection signal, is minimized. The reception polarization controller 31 is used to keep the variable electric intensity, and consequently the detection signal, at the maximum intensity. This is done in order to make it possible for the balanced optical receiver detect the detection signal with a highest possible demodulating efficiency.

Turning back to FIG. 1, each of the launch and the reception controllers 43 and 45 includes a built-in microprocessor (not shown). In the manner described in the Ono et. al. patent, the launched and the controlled states are controlled by varying the launched and the controlled states within a narrow range, namely, by resorting to a peak search method.

Inasmuch as the launch polarization controller 23 is used on the send end, the launched state is controlled by the detection signal with a propagation delay of about 1 ms. The launch controller 43 is therefore given a response speed of about 1.1 ms. The reception controller 45 is given a shorter response speed of 0.1 ms.

If the signal beam were subjected to the polarization dispersion while transmitted through the optical fiber 11, the reception data signal of 10 Gb/s would be obtained at the system output terminal 29 with an objectionably severe power penalty of 10 dB. With the polarization control system described above, it has been confirmed that the reception data signal is subjected to no power penalty.

Reviewing FIG. 1, the launch controller 43 may be placed on the receive end as depicted. It is possible to understand a combination of the balanced optical receiver (35, 37), the band-pass filter 39, and the electric intensity detector 41 as a detection arrangement responsive to the first and the second split beams for detecting the optical reception component to produce the detected signal. Another combination of the reception polarization controller 31, the polarization splitter 33, and the detecting arrangement (35–41) serves as a receiving arrangement for receiving the signal beam to produce the detection signal. The launch controller 43 is alternatively called an axis control arrangement for controlling, with the detection signal, the launch polarization controller 23 to keep the launched state in coincidence with the principal axis. The optical fiber 11 may include an optical comprised of an optical isolater amplifier which will be described in the following example.

The polarization control system is referred to as a polarization control device when only its receive end is taken into consideration. In this event, a combination of the launch controller 43 and the signal transmission line is used as a control arrangement for controlling the launch polarization controller 23. A connection from the electric intensity detector 41 to the launch controller 43 serves as a signal supply arrangement for supplying the detection signal to the control arrangement to make the control arrangement transmit the detection signal to the launch polarization controller 23 as a reception signal and control the launch polarization controller 23 by the reception signal to keep the launched state in coincidence with the principal axis of polarization.

Referring now to FIGS. 3(a) and 3(b), attention will be directed to a polarization control system according to a second embodiment of this invention. Similar parts are designated by like reference numerals and are similarly operable with optical and electric signals. The optical communication system serves as an optical amplifying and relaying system for relaying the signal beam with the signal beam amplified as it stands.

In the example being illustrated, the main optical fiber 11 is used as a down propagation path with the send and the receive ends 1,000 km apart. Nineteen optical amplifiers 47(1), 47(2), . . . 47(19) are interposed at distances of 50 km. An auxiliary, or additional optical fiber 49 serves as the signal transmission line described in conjunction with FIG. 1 and is used as an up propagation path from the receive end to the send end. Ninteen up optical amplifiers 51(1), 51(2), 51(3), 51(4), ...51(19) are between the two ends interposed. Each of the optical amplifiers 47 (suffixes omitted) and 51 (suffixes omitted) is an erbium doped fiber optical amplifier and includes an optical isolator (not shown).

In each of the down and the up propagation paths including the optical amplifiers, there is an overall polarization dispersion of 150 ps. Lased at the send end in the main laser oscillator 13, the optical beam is frequency modulated by the sinusoidal signal and intensity modulated by the transmission data signal, which is now called a down data signal.

At the receive end, the received beam is delivered to a beam branching unit 53 and is branched into primary and secondary beams. Each of the primary and the secondary beams corresponds to the first or the second split beam described in connection with FIG. 1 and is likewise processed. More specifically, the primary beam is delivered to a first polarization splitter 33(1) and is split into first and second primary beams which are orthogonally polarized. The secondary beam is delivered to a second polarization splitter 33(2) and split into first and second secondary beams which are orthogonally polarized. The first and the second primary beams are collectively referred to as a first port signal. The first and the second secondary beams are collectively called a second port signal.

It should be noted here that each of the polarization splitters 33 (suffixes omitted) has an axis of polarization. The axis of the first polarization splitter 33(1) is directed parallel to the received state of polarization. The axis of the second polarization splitter 33(2) is directed to form an angle of 45° with the received state. The first and the second polarization splitters 33 are therefore respectively called a parallel and an oblique polarization splitter. The first and the second primary beams are beams of 0° and 90° polarization relative to the received state. The first and the second secondary beams are beams of minus and plus 45° polarization relative to the received state.

Each of the first and the second primary beams includes a primary component of the modulating frequency. Each of the first and the second secondary beams includes a secondary component of the modulating frequency. Through first and second dual pin photodiodes 35(1) and 35(2), first and second signal amplifiers 37(1) and 37(2), and first and second band-pass filters 39(1) and 39(2), the primary and the secondary components are delivered to first and second electric intensity detectors 41(1) and 41(2) and converted into first and second result signals representative of variable optical intensities of the primary and the secondary components.

The first and the second result signals are added by an adder 55 to produce the detection signal described in conjunction with FIG. 1. It may be mentioned here that the principal axis of the optical fiber 11, is variable in accordance with external disturbances, such as the ambient temperature. The first and the second primary and secondary beams are, however, polarized with an angle difference of only 45°. It is therefore possible to reliably detect the detection signal from at least one of the first and the second port signals.

In the illustrated example, use is not made of the reception polarization controller 31 and of the reception controller 45 described in connection with FIG. 1. The detection signal is therefore delivered from the receive end to the send end through the up optical fiber 49 for delivery to the launch controller 43 alone. The up optical fiber 49 is additionally used in transmitting an up data signal in the manner described in the following.

At the receive end, the detection signal is delivered to an analog-to-digital converter (A/D) 57 for producing a digital detection signal. The up data signal is supplied to an up terminal 59. A multiplexer (MX) 61 multiplexes the optical detection signal and the up data signal into a multiplexed signal. An auxiliary laser oscillator 63 generates an up optical beam when an auxiliary bias current source 65 is connected to the oscillator. Intensity modulated by the multiplexed signal at an auxiliary intensity modulator 67, the up optical beam is transmitted as an up signal beam through the auxiliary optical fiber 49.

On the send end at which the up signal beam is received, a single optical receiver 69 receives the up signal beam as a received up beam. Supplied with the received up beam, a demultiplexer (DEMX) 71 produces an up data signal reproduction for delivery to an up output terminal 73 and an up digital detection signal reproduction.

Supplied with the up digital detection signal reproduction, a digital-to-analog converter (D/A) 75 produces a reproduction of the detection signal, namely of the sinusoidal signal, as the reception signal mentioned above. Controlled by the reception signal, the launch controller 43 controls the launch polarization controller 23 to keep at the receive end the detection signal minimum. The launch controller 43 has of a response speed of 11 ms which is shorter than a propagation time of the signal beam through the main optical fiber 11.

When use is not made of the first and the second port signals, it has not always been always possible to produce the received data signal to the system output terminal 29 with the best possible reception sensitivity throughout a long time interval. It has, however, been confirmed that use of four polarization states for the first and the second primary and secondary beams enables reliable and long-continued reception of the received data signal with no adverse influences on the reception by the external disturbances.

Reviewing FIGS. 3(a) and 3(b), the polarization control system is again called a polarization control device when its receive end alone is taken into consideration. The control arrangement now comprises the launch controller 43 and the additional optical fiber 49. It is possible to transmit the detection signal in an analog type as it stands through the additional optical fiber 49 by superposing on the up optical beam either by amplitude or by frequently modulating a subcarrier signal. It is also possible to split by polarization the primary and the secondary beams into the first and the second primary and secondary beams using directions of polarization different from the four directions. exemplified above.

Reviewing FIGS. 1, 5(a), and 3(b), it is possible to use any one of known polarization controllers for the launch polarization controller 23 and for the reception polarization controller 31 if used. For example, equally well suited are a waveguide polarization controller made of lithium niobate, a polarization controller of a wavelength plate rotating type, and a liquid crystal polarization controller.

While this invention has thus far been described specifically conjunction with only two preferred embodiments and several modifications, it will now be readily possible for one skilled in the art to put this invention into practice in various other manners. For example, it is possible to detect the detection signal either from at least one of the first and the second split beams or from at least one of the first and the second primary or secondary beams.

What is claimed is:

1. A method of controlling a polarization state of an optical beam, subjected to modulation by modulating frequency, for transmission as a signal beam through an optical fiber having a principal axis of polarization, said method comprising the steps of:

launch controlling said polarization state into a launched state to supply a launched beam of said launched state to said optical fiber as said signal beam;

receiving said signal beam as a received beam wherein said receiving step further comprises the steps of:

branching said received beam into primary and secondary beams;.

beam splitting said ..primary beam into a first primary beam of 0° polarization and a second primary beam of 90° polarization, each of said first and said second primary beams including a primary component of said modulating frequency;

subjecting at least one of said first and said second primary beams to intensity detection of said primary component to produce a first result signal representative of an intensity of said primary component;

beam splitting said secondary beam into a first secondary beam of minus 45° polarization and a second secondary beam of plus 45° polarization, each of said first and said second secondary beams including a secondary component of said modulating frequency;

subjecting at least one of said first and said second secondary beams to intensity detection of said secondary component to produce a second result signal representative of an intensity of said secondary component; and adding said first and said second result signals to produce a detection signal; and axis controlling said launch controlling step with said detection signal to keep said launched state in coincidence with said principal axis.

2. A polarization control system for use in an optical communication system for transmitting as a signal beam an optical beam modulated by modulating frequency, through an optical fiber having a principal axis of polarization, said polarization control system comprising:

a launch polarization controller for controlling said polarization state into a launched state to supply a launched beam of said launched state to said optical fiber as said signal beam;

a receiving said signal beam as a receiving beam wherein said receiving means further comprises:

a beam branching unit for branching said received beam into primary and secondary beams;

a first beam splitter for splitting said primary beam into a first primary beam of 0° polarization and a second primary beam of 90° polarization, each of said first and said second primary beams including a primary component of said modulating frequency;

a first intensity detecting means for subjecting at least one of said first and said second primary beams to intensity detection of said primary component to produce a first result signal representative of an intensity of said primary component;

a second beam splitter for splitting said secondary beam into a first secondary beam of minus 45° polarization and a second secondary beam of plus 45° polarization, each of said first and said second secondary beams including a secondary component of said modulating frequency;

a second intensity detection means for subjecting at least one of said first and said second secondary beams to intensity detection of said secondary component to produce a second result signal representative of an intensity of said secondary component; and an adder for adding said first and said second result signals to produce a detection signal; and an axis controlling means for controlling said launched polarization controller with said detection signal to keep said launched state in coincidence with said principal axis.

3. A polarization control device used in an optical communication system comprising a launch polarization controller controlling a polarization state of an optical beams, modulated by a modulating frequency into a launched state to supply as a signal beam a launched beam of said launched state. to an optical fiber having a principal axis of polarization and control means for controlling said launch polarization controller, said polarization control device comprising:

a receiving means for receiving said signal beam as a received beam wherein said receiving means further comprises:

a beam branching unit for branching said received signal into primary and secondary beams;

a first beam splitter for splitting said primary beam into a first primary beam of 0° polarization and a second primary beam of 90° polarization, each of said first and second primary beams including a primary component of said modulating frequency;

a first intensity detecting means for subjecting at least one of said first and said second primary beams to intensity detection of said primary component to produce a first result signal representative of an intensity of said primary component;

a second beam splitter for splitting said secondary beam into a first secondary beam of minus 45° polarization and a second secondary beam of plus 45° polarization, each of said first and said second secondary beams including a secondary component of said modulating frequency;

a second intensity detection means for subjecting at least one of said first and said second secondary beams to intensity detection of said secondary component to produce a second result signal representative of an intensity of said secondary component; and an adder for adding said first and said second result signals to produce a detection signal; and a signal supply means for supplying said detection signal to said control means to make said control means transmit said detection signal to said launch polarization controller as a reception signal and control said launch polarization controller with said reception signal to keep said launched state in coincidence with said principal axis.

4. A polarization control device as claim in claim 3, wherein:

said first intensity detecting means further comprises:

a first optical receiver for detecting at least one of said first and second primary beams to produce a first detected signal including a first detected component modulated by said modulating frequency; and a first intensity detector for detecting said first detected signal to produce said first result signal; and said second intensity detecting means further comprises:

a second optical receive for detecting at least one of said first and second secondary beams to produce a second detected signal including a second detected component modulated by said modulating frequency; and a second intensity detector for detecting said second detected signal to produce said second result signal.

5. A polarization control device as claimed in claim 3, said control means comprising an additional optical fiber for transmitting an input beam as a transmitted beam to produce an output beam, a single optical receiver for receiving said output beam to produce an output signal, and additional supply means for supplying said output signal as said reception signal to said launch polarization controller, wherein said signal supply means comprises an intensity modulator for modulating an additional optical beam with said detection signal into a modulated beam to supply said modulated beam to said additional optical fiber as said input beam.

* * * * *

UNITED STATES PATENT AND TRADEMARK OFFICE
CERTIFICATE OF CORRECTION

PATENT NO. : 5,508,839
DATED : April 16, 1996
INVENTOR(S) : Takashi Ono

It is certified that error appears in the above-indentified patent and that said Letters Patent is hereby corrected as shown below:

Column 1, line 15, delete "th" and insert --the--;
line 24, delete "coauthor" and insert --co-author--;
line 39, delete "degrades. Reception" and insert --degrades reception--.

Column 4, lines 16-18, delete "has a variable optical intensity $I_o$ which depends on the received";
line 19, after "and" insert --has a variable optical intensity $I_o$ which depends on the received--;
line 20, delete "sit" and insert --split--.

Column 5, line 10, delete "alemodulated" and insert --demodulated--;
line 22, delete "batanoed" and insert --balanced--.

Column 8, line 16, delete "5(a)" and insert --3(a)--;
line 23, delete "conjunction".

Signed and Sealed this

Thirtieth Day of July, 1996

Attest:

BRUCE LEHMAN

*Attesting Officer*         *Commissioner of Patents and Trademarks*